United States Patent [19]

McLelland et al.

[11] Patent Number: 5,702,094
[45] Date of Patent: Dec. 30, 1997

[54] FLUID DAMPED BUSHING WITH ENCAPSULATED WINDOW METAL

[75] Inventors: Douglas M. McLelland; Paul T. Wolfe, both of Fort Wayne; Richard D. Hein, Wabash, all of Ind.

[73] Assignee: BTR Antivibration Systems, Inc., Ft. Wayne, Ind.

[21] Appl. No.: 597,054

[22] Filed: Feb. 5, 1996

Related U.S. Application Data

[63] Continuation-in-part of Ser. No. 289,027, Aug. 10, 1994, Pat. No. 5,496,018.

[51] Int. Cl.$^6$ .................................................. F16F 5/00
[52] U.S. Cl. ............................. 267/140.12; 267/141.4
[58] Field of Search ........................ 267/140.12, 141.2, 267/141.4, 141.5, 140.11, 292, 293, 219, 141; 248/562, 636; 180/300, 312

[56] References Cited

U.S. PATENT DOCUMENTS

| 4,953,833 | 9/1990 | Schmidt et al. ............... 267/140.12 |
| 5,496,018 | 3/1996 | McLelland et al. ............. 267/140.12 |

FOREIGN PATENT DOCUMENTS

| 0406835A | 1/1991 | European Pat. Off. |
| 0418718A | 3/1991 | European Pat. Off. |
| 0425759A | 5/1991 | European Pat. Off. |
| 0429362A | 5/1991 | European Pat. Off. |
| 04157230 | 5/1992 | Japan . |
| 9006455 | 6/1990 | WIPO . |

Primary Examiner—Peter M. Poon
Attorney, Agent, or Firm—Wood, Herron & Evans

[57] ABSTRACT

A fluid damped bushing (10, 100) comprising a metallic sleeve (12, 112) and an annular elastomeric body (14, 114) mold bonded to the exterior of the metallic sleeve. The elastomeric body has a spaced apart pair of fluid containing recesses (18, 118 and 20, 120) in its exterior surface with a serpentine shaped inertia track (26, 126) in the outermost surface of the elastomeric body to provide communication between the recesses. A window metal sleeve (16, 116) is encapsulated within the elastomeric body by mold bonding, and the window metal sleeve has a longitudinally spaced apart pair of rings (30, 130 and 32, 132) above and below the level of the recesses, respectively, and a diametrically opposed pair of webs (38, 138 and 40, 140) extending between the rings. In a first embodiment, a plurality of outwardly projecting pads (28) is located in one of the webs in the region of the inertia track to prevent deformation of the inertia track under lead. The annular elastomeric body inserted into an outer metallic sleeve (36, 136), while the sleeve and the elastomeric body are immersed in a damping fluid, and the diameter of the outer sleeve is then reduced by a swaging process to tightly seal the sleeve against the annular elastomeric body and to seal the damping fluid in the recesses and the inertia track. In another embodiment of the invention the metallic sleeve (112) has a generally elliptical, axially short rigid polymeric collar (140) affixed to the central portion thereof. The radially longer lobes (140a) of the collar are aligned with the recesses (118, 120) and serve to limit the amount of radial deflection of the bushing (100).

10 Claims, 5 Drawing Sheets

FLUID DAMPED BUSHING WITH ENCAPSULATED WINDOW METAL

CROSS-REFERENCE TO RELATED APPLICATION

This application is a continuation-in-part of application Ser. No. 08/289,027, filed Aug. 10, 1994, now U.S. Pat. No. 5,496,018.

FIELD OF THE INVENTION

This invention relates to a fluid damped resilient bushing of a type used in automotive suspension or power train systems to improve the noise, vibration and handling characteristics of an automotive vehicle. More particularly, this invention relates to a bushing of the foregoing character with a window metal element that is embedded in or encapsulated by the resilient member of the bushing.

BACKGROUND OF THE INVENTION

Fluid damped bushings are used in automotive suspension and power train applications to improve the noise, vibration and handling characteristics of the automotive vehicle. Typically, such a fluid damped bushing has an inner metal sleeve to which is bonded an annular elastomeric, resilient member. The annular elastomeric member has a spaced apart pair of recesses in its outer surface, and the recesses are interconnected by a flow passage that has a high resistance to flow. The annular elastomeric member is then surrounded by an outer metal sleeve which seals the recesses and the flow passage of the annular elastomeric member.

A fluid damped bushing of the foregoing type typically requires that an intermediate sleeve, known as a window metal, be inserted between the annular elastomeric member and the outer sleeve, the window metal sleeve being provided with openings to be aligned with the recesses in the resilient member. Because of the metallic character of the window metal, the outer metal sleeve must be provided with a lining member of a resilient material to provide for proper sealing between the outer metal sleeve and the window metal sleeve. Further, for proper functioning of a fluid damped bushing it is necessary to provide a restricted passage between the fluid containing recesses, such passage frequently being referred to as an inertia track. The damping effect of the bushing is determined by the resistance to flow of the inertia track, and this, in turn, depends upon its length and its cross-sectional area. When such an inertia track is formed in the elastomeric member of the bushing, its damping effect becomes variable, because of the possibility that the track can be distorted by the distortion of the bushing as it undergoes the imposition of loads, and the removal of loads, during its normal service.

BRIEF SUMMARY OF THE INVENTION

According to the present invention there is provided a fluid damped bushing which is simpler in construction than fluid damped bushings of the prior art. The fluid damped bushing of the preferred embodiment of the present invention eliminates the need for a sealing liner on the inside surface of the outer metal sleeve of the bushing, and it does so by embedding or encapsulating the window metal within the annular elastomeric member of the bushing during the molding of the bushing. Thus, the outer metal sleeve directly engages an elastomeric surface of the annular elastomeric member of the bushing, rather than the metallic surface of the window metal sleeve of the bushing, and the sealing of the inner surface of the outer metal sleeve is by sealing contact between the metallic inner surface of the sleeve and the resilient surface of the annular elastomeric member.

Further, in an embodiment of the present invention the inertia track in the outer surface of the annular resilient member of the bushing, between the spaced apart fluid containing recesses of the bushing, is free from distortion under the normal loads encountered by the bushing in service and reduces inertia track distortion in the axial and circumferential planes due to hydraulic pressure increase during service since the inertia track is supported by the window metal sleeve, which is provided with suitable inertia track defining projections therein.

Accordingly, it is an object of the present invention to provide an improved fluid damped bushing. More particularly, it is an object of the present invention to provide a bushing of the foregoing character which may be produced to close tolerances in a repetitive manufacturing operation at a reasonable cost. More particularly, it is an object of the present invention to provide a fluid damped bushing of the foregoing character whose outer metal sleeve need not be lined with an elastomeric or other resilient sealing material.

For a further understanding of the present invention and the objects thereof, attention is directed to the drawing and the following brief description thereof, to the detailed description of the preferred embodiment and to the appended claims.

DETAILED DESCRIPTION OF THE PREFERRED EMBODIMENT

Figure 1:
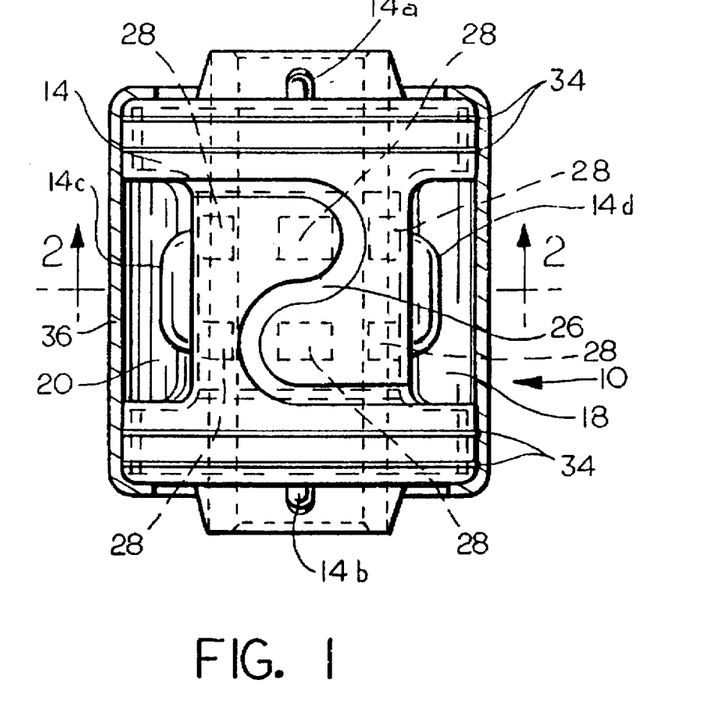
FIG. 1 is an elevational view, partly in cross-section, of a fluid damped bushing according to the preferred embodiment of the present invention.
Figure 2:
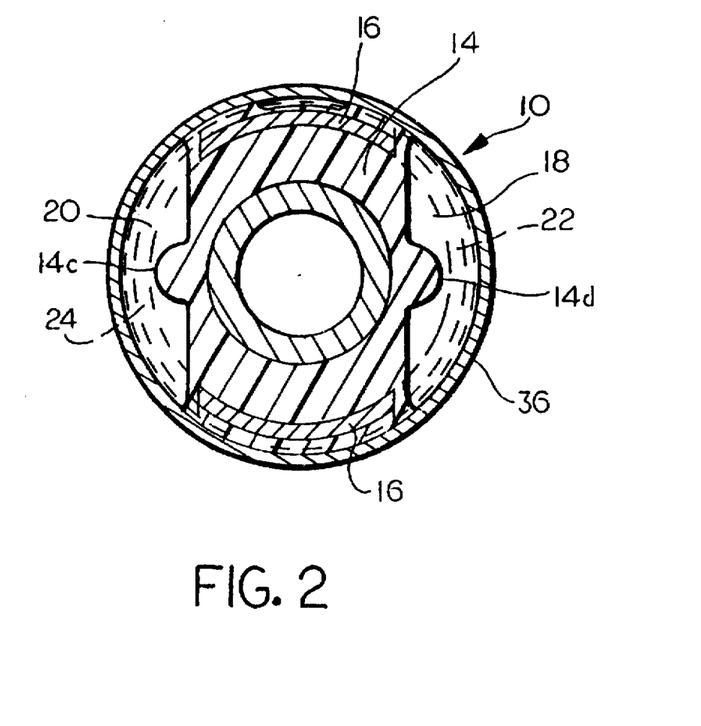
FIG. 2 is a cross-sectional view taken on line 2—2 of FIG. 1.

A bushing according to an embodiment of the present invention is identified generally by reference numeral 10 in FIGS. 1 and 2. The bushing 10 is made up of an inner metal sleeve 12, and the sleeve 12 is mold bonded in surface-to-surface contact to the inner surface of an annular elastomeric member 14. The annular elastomeric member 14 has a window metal sleeve 16 encapsulated therein during its molding process and winds up being mold bonded to the window metal sleeve 16.

The annular elastomeric member 14 is molded with a spaced apart pair of recesses 18, 20 in its outer generally cylindrical surface, each of the recesses 18, 20 beginning below the uppermost extent of the elastomeric body 14 and ending above the lowermost extent of the elastomeric body 14, in the arrangement illustrated in FIG. 1. The window metal sleeve 16 is formed with openings, or windows, 22, 24 in radial alignment with the recesses 18, 20, respectively, of the annular elastomeric body.

Restricted flow communication between the recesses 18, 20 is provided by an inertia track 26, which is formed in the outer, generally cylindrical surface of the annular elastomeric member 14 at a location between the recesses 18, 20. The inertia track 26, which is serpentine shaped to provide for maximum damping, has its opposed ends in fluid communication with the recesses 18, 20, respectively.

Figure 3:
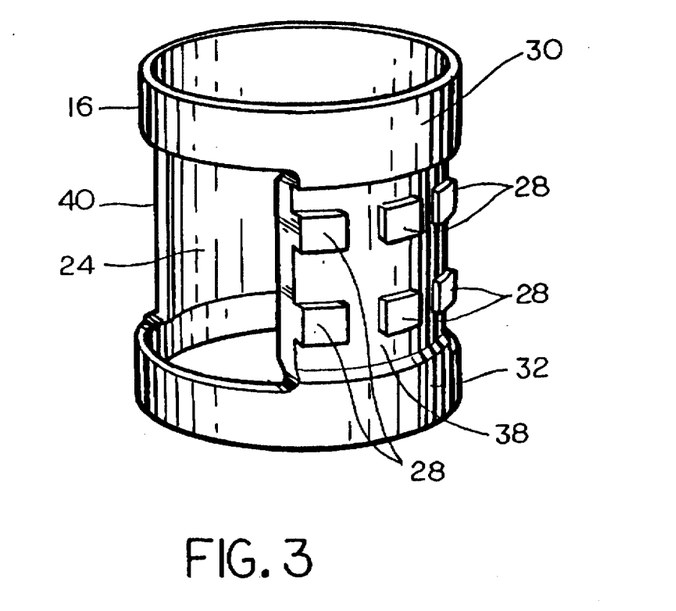
FIG. 3 is a perspective view of an element of the bushing of FIGS. 1 and 2.
Figure 4:
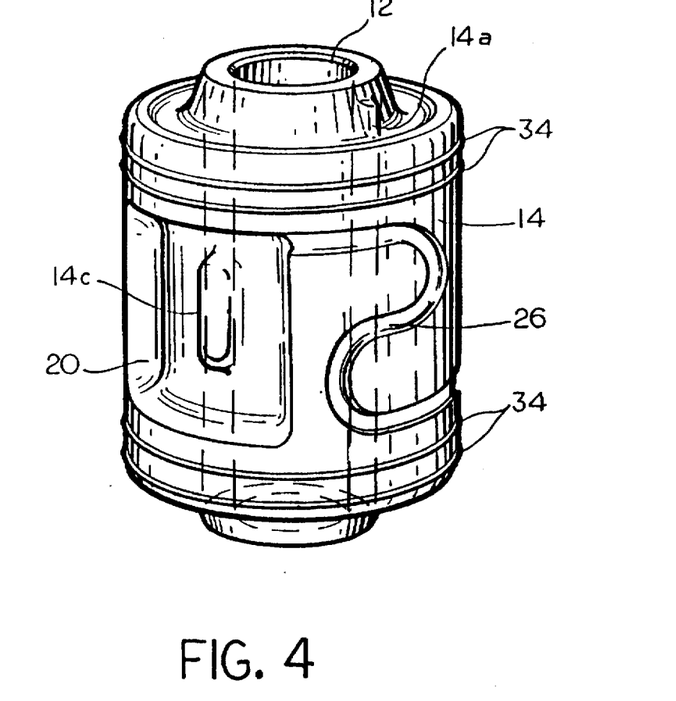
FIG. 4 is a perspective view of a combination of elements of the bushing of FIGS. 1 and 2.

The inertia track 26 of the annular elastomeric member 14 is supported against deformation during the distortion of the annular elastomeric member 14, as a result of the loads encountered in normal service, by spaced apart, outwardly projecting pads 28 in the window metal sleeve 16. The window metal sleeve 16 is also provided with continuous rings 30, 32 at its upper and lower extremities, respectively, and the annular elastomeric body 14 is provided with one or more outwardly projecting sealing ribs 34 in radial alignment with each of the rings 30, 32, for a purpose which will be hereinafter described more fully. The pads 28 of the window metal sleeve 16 are formed in one of a diametrically opposed pair of webs 38, 40, shown as the web 38, that extend between the rings 30, 32 on opposite sides of the recesses 18, 20. Thus, the webs 38, 40, in combination with the rings 30, 32, serve to form a window metal sleeve 16 of unitary construction. A subassembly of the bushing 10, which is made up of the sleeve 12, the elastomeric member 14, and the window metal sleeve 16, as illustrated in FIG. 4, is assembled into its final configuration by immersing the subassembly in a suitable damping fluid to allow the fluid to fill each of the recesses 18, 20, and the inertia track 26. In that regard, a suitable damping fluid can be an aqueous solution of ethylene glycol, or an aqueous solution of propylene glycol, or a mixture of such solutions. While immersed in the damping fluid, the subassembly is pressed into an outer metal sleeve 36, which need not be lined on its inner surface with a pre-applied sealing liner. The sleeve 36 has one of its opposed ends rolled in before the assembly step to serve as a stop for an outermost end of the FIG. 4 subassembly. Then, the sleeve 36 is preferably swaged to slightly reduce its diameter, to thereby ensure a good seal between the inside surface of the sleeve 36 and the ribs 34 of the annular elastomeric member 14. Thereafter, the other of the opposed ends of the sleeve 36 is rolled in against the outermost end of the other end of the FIG. 4 subassembly, to form a fluid tight assembly of all of the components of the bushing 10.

Distortion of the elastomeric member 14 during the loads encountered in service will have the effect of reducing the volume of one of the recesses 18, 20 and increasing the volume of the other of such recesses by an equal amount. This will cause the damping fluid to flow through the inertia track 26 into the recess of the recesses 18, 20 that is increasing in volume. The high restriction to flow of the inertia track 26, which results from its length and its small cross-sectional area, will limit the rate at which the elastomeric member 14 can distort under load, and the rate at which it can return to its unloaded shape when the load is removed. Thus, the fluid in the recesses 18, 20 serves to dampen the distortion of the elastomeric member 14 in its reaction to the loads that it encounters in normal service and as it recovers from the removal of such loads.

Preferably, the annular elastomeric member 14 is molded with outwardly projecting tabs 14a, 14b in its opposed ends. The tabs 14a, 14b are positioned at predetermined positions relative to the recesses 18, 20, and serve to indicate the locations of the recesses 18, 20 in the assembled bushing 10, since the recesses 18, 20 will then be concealed from view by the sleeve 36. Further, the annular elastomeric member 14 is molded with outwardly projecting bumps 14c, 14d centered in recesses 20, 22, respectively. As shown in FIG. 2, the bumps 14c, 14d extend only partly to the inside surface of the sleeve 36. Thus, the bumps 14c, 14d will increase the resistance of the bushing 10 to radial deflection after a predetermined radial deflection of the inner metal sleeve 12 relative to the sleeve 36.

In the embodiment of the invention illustrated in FIGS. 5–10, elements corresponding to the embodiment of FIGS. 1–4 are identified by one hundred series numerals, the last two digits of which are the same as the two digits of the corresponding element of the embodiment of FIGS. 1–4.

Figure 5:
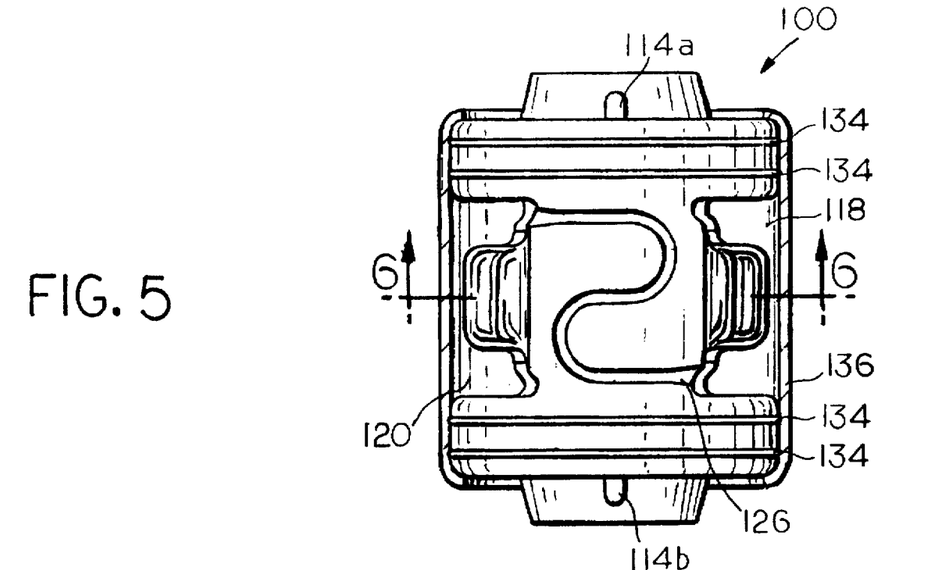
FIG. 5 is a view similar to FIG. 1 of an alternative embodiment of the present invention.
Figure 6:
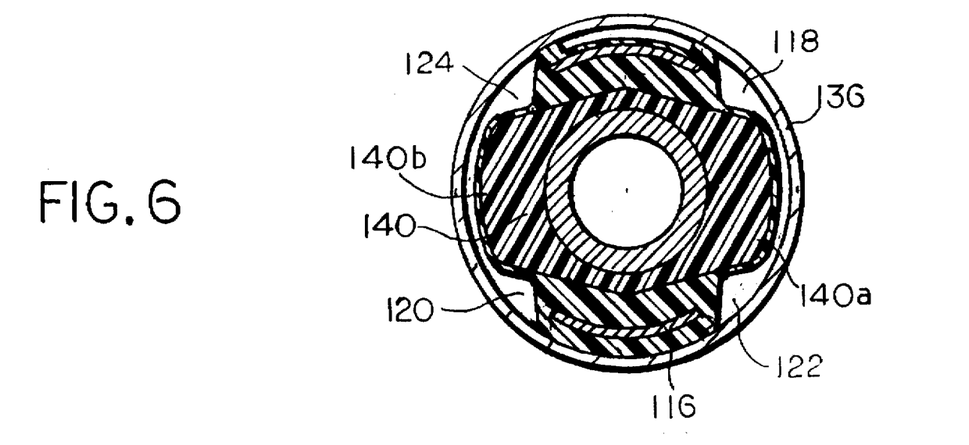
FIG. 6 is a sectional view taken on line 6—6 of FIG. 5.
Figures 7, 8, 9:
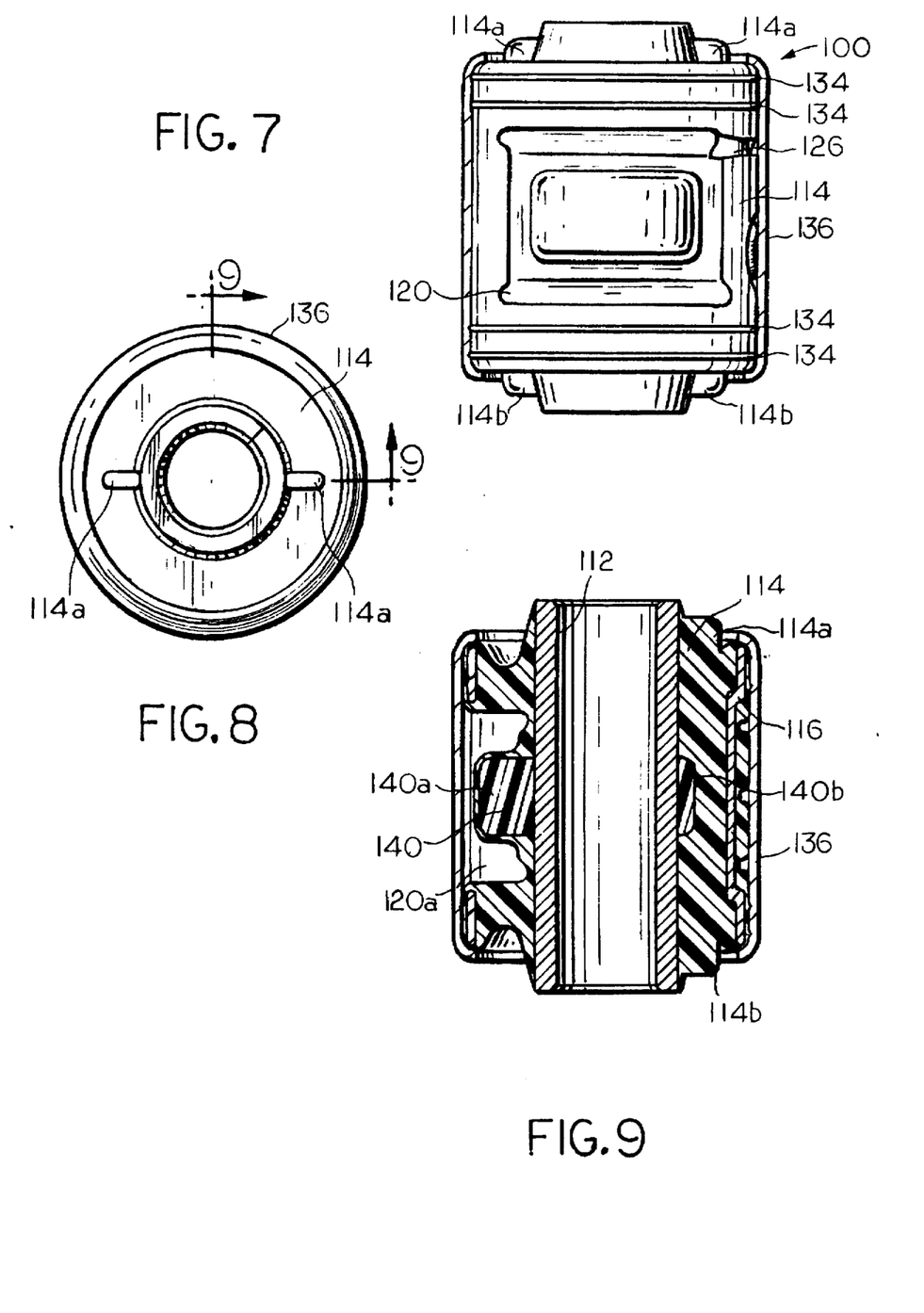
FIG. 7 is a view similar to FIG. 5, but taken at a right angle thereto.
FIG. 8 is a plan view of the bushing of FIGS. 5–7.
FIG. 9 is a sectional view taken on line 9—9 of FIG. 8.

A bushing according to the embodiment of the present invention that is illustrated in FIGS. 5–10 is identified generally by reference manual 100 in FIGS. 5, 7 and 8. The bushing of 100 is made up of an inner metal sleeve 112, and the sleeve 112 is mold bonded in surface-to-surface contact to the inner surface of an annular elastomeric member 114. The annular elastomeric member 114 has a window metal sleeve 116 encapsulated therein during its molding process and winds up being mold bonded to the window metal sleeve 116.

The annular elastomeric member 114 is molded with a spaced apart pair of recesses 118, 120 in its outer generally cylindrical surface, each of the recesses 118, 120 beginning below the uppermost extent of the elastomeric body 114 and ending above the lowermost extent of the elastomeric body 114, in the arrangement illustrated in FIG. 5. The window metal sleeve 116 is formed with openings 122, 124 in radial alignment with the recesses 118, 120, respectively, of the annular elastomeric body.

Restricted flow communication between the recesses 118, 120 is provided by an inertia tract 126, which is formed in the outer, generally cylindrical surface of the annular elastomeric member 114 at a location between the recesses 118, 120. The inertia track 126, which is serpentine shaped to provide for maximum damping, has its opposed ends in fluid communication with the recesses 118, 120, respectively.

Figure 10:
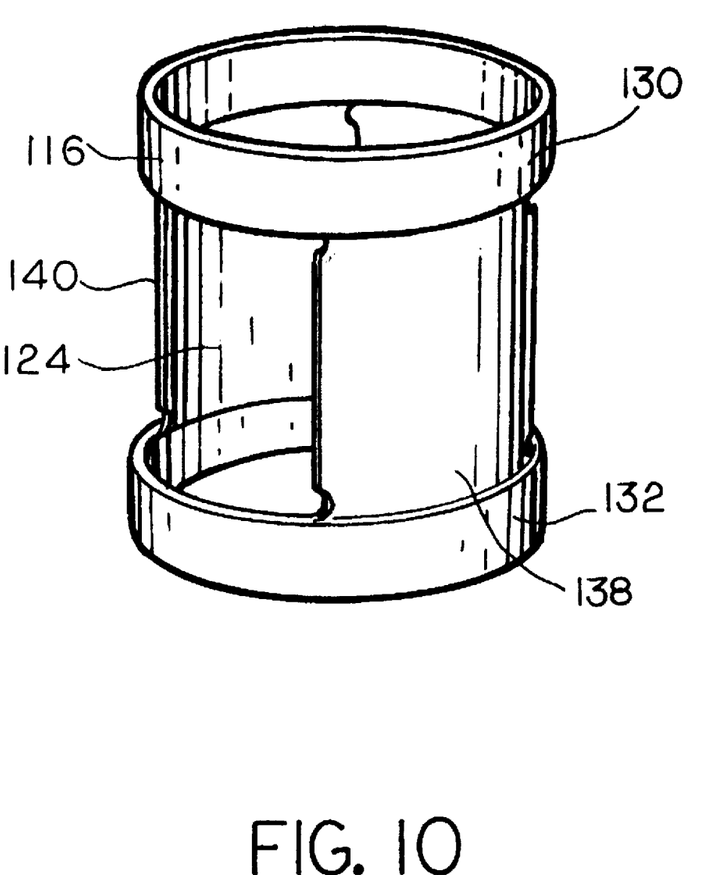
FIG. 10 is a perspective view of an element of the bushing of FIGS. 5–9.

The window metal sleeve 116 is provided with continuous rings 130, 132 at its upper and lower extremities, respectively, and the annular elastomeric body 114 is provided with one or more outwardly projecting sealing ribs 134 in radial alignment with each of the rings 130, 132, for a purpose which will be hereinafter described more fully. The window metal sleeve 16 also has a diametrically opposed pair of webs 38, 40, shown as the web 38, that extend between the rings 130, 132 on opposite sides of the recesses 118, 120. Thus, the webs 138, 140, in combination with the rings 130, 132, serve to form a window metal sleeve 116 of unitary construction.

A subassembly of the bushing 110, which is made up of the sleeve 112, the elastomeric member 114, and the window metal sleeve 116, is assembled into its final configuration by immersing the subassembly in a suitable damping fluid to allow the fluid to fill each of the recesses 118, 120, and the inertia track 126. In that regard, a suitable damping fluid can be an aqueous solution of ethylene glycol, or an aqueous solution of propylene glycol, or a mixture of such solutions. While immersed in the damping fluid, the subassembly is pressed into an outer metal sleeve 136, which need not be lined on its inner surface with a pre-applied sealing liner. The sleeve 136 has one of its opposed ends rolled in before the assembly step to serve as a stop for an outermost end of the subassembly. Then, the sleeve 136 is preferably swaged to slightly reduce its diameter, to thereby ensure a good seal between the inside surface of the sleeve 136 and the ribs 134 of the annular elastomeric member 114. Thereafter, the other of the opposed ends of the sleeve 136 is preferably rolled in against the outermost end of the other end of the subassembly, to form a fluid tight assembly of all of the components of the bushing 110.

Distortion of the elastomeric member 114 during the loads encountered in service will have the effect of reducing the volume of one of the recesses 118, 120 and increasing the volume of the other of such recesses by an equal amount. This will cause the damping fluid to flow through the inertia track 126 into the recess of the recesses 118, 120 that is increasing in volume. The high restriction to flow of the inertia track 126, which results from its length and its small cross-sectional area, will limit the rate at which the elastomeric member 114 can distort under load, and the rate at which it can return to its unloaded shape when the load is removed. Thus, the fluid in the recesses 118, 120 serves to dampen the distortion of the elastomeric member 114 in its reaction to the loads that it encounters in normal service and as it recovers from the removal of such loads.

Preferably, the annular elastomeric member 114 is molded with outwardly projecting tabs 114a, 114b in its opposed ends. The tabs 114a, 114b are positioned at predetermined positions relative to the recesses 118, 120, and serve to indicate the locations of the recesses 118, 120 in the assembled bushing 100, since the recesses 118, 120 will then be concealed from view by the sleeve 136.

The deflection of the bushing 110, after a predetermined initial deflection, is limited by affixing an axially short, rigid polymeric, generally elliptical collar 140 to a central portion of the inner metal sleeve 112 and preferably to a knurled or otherwise surface extended position thereof. The collar 140, the entirety of which is encapsulated within the elastomeric member 114, is provided with a diametrically opposed pair of lobes 140a that extend radially outwardly from sleeve 112 for a substantial distance and second diametrically opposed pair of lobes 140b that extend radially outwardly from the sleeve 112 for a substantial distance and a second diametrically opposed pair of lobes 140b that are interleaved with the lobes 140 and extend radially outwardly from the sleeve 112 for a lesser distance. The lobes 140a are circumferentially aligned with the recesses 118, 120, and serve as stops to limit the amount of radial deflection that the bushing 100 will undergo, notwithstanding the magnitude of the load imposed thereon.

Although the best mode contemplated by the inventor(s) for carrying out the present invention as of the filing date hereof has been shown and described herein, it will be apparent to those skilled in the art that suitable modifications, variations, and equivalents may be made without departing from the scope of the invention, such scope being limited solely by the terms of the following claims and the legal equivalents thereof.

What is claimed is:

1. A fluid damped bushing comprising:

a rigid cylindrical member;

an annular elastomeric member having an inner surface, said elastomeric member engaging an outer surface of said rigid cylindrical member in surface to surface contact, said annular elastomeric member further having first and second circumferentially spaced apart recesses in an outer, generally cylindrical surface thereof;

an inertia track passage formed in an outer surface of said annular elastomeric member, said inertia track passage providing restricted fluid communication between said first and second circumferentially spaced apart recesses;

window metal means encapsulated in said annular elastomeric member, said window metal means comprising first and second rings longitudinally spaced apart at locations external to said first and second circumferentially spaced apart recesses;

an outermost sleeve circumscribing said elastomeric member, said outermost sleeve sealing a damping fluid contained in said first and second circumferentially spaced apart recesses; and a substantially incompressible damping fluid contained in said circumferentially spaced apart recesses, said damping fluid being added by immersing a subassembly comprising said annular elastomeric member and said window metal means in damping fluid and then pressing the subassembly into said outermost sleeve;

a generally elliptical, rigid polymeric collar affixed to a central portion of said rigid cylindrical member, said collar being encapsulated within said annular elastomeric member and having;

a first diametrically opposed pair of lobes extending radially outwardly from said cylindrical member for a first distance; and a second diametrically opposed pair of lobes extending radially outwardly from said cylindrical member for a second distance, said lobes of said second pair of lobes being interleaved with the lobes of said first pair of lobes, said second distance being less than said first distance;

said first pair of lobes being circumferentially aligned with said first and second circumferentially spaced apart recesses and serving to limit the radial deflection of said bushing beyond a predetermined amount of radial deflection.

2. A fluid damped bushing according to claim 1 wherein said window metal means further comprises web means extending between said first and second rings to join said first and second rings to one another in a unitary member.

3. A fluid damped bushing according to claim 2 wherein said web means comprises first and second circumferentially spaced apart webs, said first and second webs being circumferentially offset with respect to said first and second recesses.

4. A fluid damped bushing according to claim 1 wherein said rigid cylindrical member is a metallic member, and wherein said metallic member is mold bonded to said annular elastomeric member.

5. A fluid damped bushing according to claim 4 wherein said window metal means is encapsulated within said annular elastomeric member by mold bonding.

6. A fluid damped bushing according to claim 1 wherein said damping fluid is selected from the group consisting of an aqueous solution of ethylene glycol, an aqueous solution of propylene glycol and a mixture of an aqueous solution of ethylene glycol and propylene glycol.

7. A fluid damped bushing according to claim 1 wherein said inertia track passage is serpentine shaped in configuration.

8. A fluid damped bushing according to claim 1 wherein said outermost sleeve is a metal sleeve, and wherein each of an opposed pair of ends of said metal sleeve is inwardly rolled.

9. A fluid damped bushing according to claim 1 wherein said outermost sleeve is swaged to reduce its diameter after it is applied to said annular elastomeric member and before one of its opposed ends is inwardly rolled.

10. A fluid damped bushing according to claim 1 wherein said annular elastomeric member is provided with outwardly projecting annular rib means in radial alignment with each of said first and second rings of said window metal means.

* * * * *

UNITED STATES PATENT AND TRADEMARK OFFICE
CERTIFICATE OF CORRECTION

PATENT NO. : 5,702,094
DATED : December 30, 1997
INVENTOR(S) : Douglas M. McLelland, Richard D. Hein and Paul T. Wolfe It is certified that error appears in the above-indentified patent and that said Letters Patent is hereby corrected as shown below:

ABSTRACT, line 17, "under lead." should read -- under load. --

ABSTRACT, line 18, "inserted" should read -- is insetted --.

Signed and Sealed this

Fifth Day of May, 1998

Attest:

BRUCE LEHMAN

Attesting Officer   Commissioner of Patents and Trademarks